(12) United States Patent
Ahmed

(10) Patent No.: US 12,357,979 B1
(45) Date of Patent: Jul. 15, 2025

(54) $PbTiO_3/TiO_2/Zn_2Ti_3O_8$ NANOCOMPOSITE MATERIAL AND METHOD OF PREPARATION THEREOF

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/042,743

(22) Filed: Jan. 31, 2025

(51) Int. Cl.
| | | |
|---|---|---|
| *B01J 35/00* | (2024.01) | |
| *B01J 21/06* | (2006.01) | |
| *B01J 23/06* | (2006.01) | |
| *B01J 23/14* | (2006.01) | |
| *B01J 35/30* | (2024.01) | |
| *B01J 35/33* | (2024.01) | |
| *B01J 35/40* | (2024.01) | |
| *B01J 37/03* | (2006.01) | |
| *B01J 37/04* | (2006.01) | |
| *B01J 37/08* | (2006.01) | |

(52) U.S. Cl.
CPC ............ *B01J 35/19* (2024.01); *B01J 21/063* (2013.01); *B01J 23/06* (2013.01); *B01J 23/14* (2013.01); *B01J 35/33* (2024.01); *B01J 35/393* (2024.01); *B01J 35/40* (2024.01); *B01J 37/036* (2013.01); *B01J 37/04* (2013.01); *B01J 37/08* (2013.01)

(58) Field of Classification Search
CPC .......... B01J 35/393; B01J 35/40; B01J 35/33; B01J 21/063; B01J 23/06; B01J 23/14; B01J 37/036; B01J 37/04; B01J 37/08
See application file for complete search history.

(56) References Cited

U.S. PATENT DOCUMENTS

2024/0075680 A1   3/2024   Malveaux et al.

FOREIGN PATENT DOCUMENTS

| CN | 108511730 B | 11/2020 |
|---|---|---|
| CN | 114100602 A | 3/2022 |
| CN | 111111696 B | 7/2022 |
| CN | 115121242 B | 12/2023 |

OTHER PUBLICATIONS

Padilla et al., Journal Physics and Chemistry of Solids, (2023), v. 179, p. 111410(1-9).*

L.R. Padilla Jr et al., "Composite nanofibers electrospun from cerium, titanium, and zinc precursors", Journal of Physics and Chemistry of Solids, vol. 179, Aug. 2023, 11410, 5 Pages.

\* cited by examiner

*Primary Examiner* — Yong L Chu
(74) *Attorney, Agent, or Firm* — Oblon, McClelland, Maier & Neustadt, L.L.P.

(57) ABSTRACT

A porous particulate nanocomposite material containing, as determined by X-ray diffraction: a cubic $Zn_2Ti_3O_8$ crystalline phase; a tetragonal $PbTiO_3$ crystalline phase; and, an orthorhombic $TiO_2$ crystalline phase. In the porous particulate nanocomposite material, based on the total number of atoms in the nanocomposite material: the atomic concentration of titanium (Ti) is from about 15 to about 25 atom %; the atomic concentration of zinc (Zn) is from about 5 to about 15 atom %; and, the atomic concentration of lead (Pb) is from about 15 to about 25 atom %.

20 Claims, 5 Drawing Sheets

50

```
┌─────────────────────────────────────────────────────────┐
│  Form an mixture by adding an aqueous solution of a     │
│  lead salt and a zinc salt to a solution in a polar     │
│  protic solvent of a titanium compound selected from    │──52
│  the group consisting of titanium methoxide (Ti(OMe)₄), │
│  titanium ethoxide (Ti(OEt)₄), titanium isopropoxide    │
│  (Ti(OiPr)₄), titanium tert-butoxide (Ti(O-tBu)₄) and   │
│  titanium diisopropoxide bis-acetylacetonate            │
└─────────────────────────────────────────────────────────┘
                            │
                            ▼
┌─────────────────────────────────────────────────────────┐
│       Add an aqueous solution of an amino acid into     │──54
│                the mixture to form a gel                │
└─────────────────────────────────────────────────────────┘
                            │
                            ▼
┌─────────────────────────────────────────────────────────┐
│  Heat the gel under stirring at a temperature of from   │──56
│   200 to 400°C for a sufficient duration to form a      │
│                       dry powder                        │
└─────────────────────────────────────────────────────────┘
                            │
                            ▼
┌─────────────────────────────────────────────────────────┐
│  Calcinate the dry powder at a temperature of from 500  │──58
│       to 800°C to form the nanocomposite material       │
└─────────────────────────────────────────────────────────┘
```

FIG. 1A

$PbTiO_3/TiO_2/Zn_2Ti_3O_8$ NANOCOMPOSITE MATERIAL AND METHOD OF PREPARATION THEREOF

BACKGROUND

Technical Field

The present disclosure is directed to a particulate nanocomposite material and, more particularly, to a porous particulate nanocomposite material of $PbTiO_3/TiO_2/Zn_2Ti_3O_8$ which is fabricated using a sol-gel combustion method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The present disclosure builds upon and addresses gaps in existing research and technologies related to multi-phase nanocomposites, particularly those involving $PbTiO_3$, $TiO_2$, and $Zn_2Ti_3O_8$. Previous studies have extensively explored the synthesis and applications single-component or binary-component nanostructures, such as: $PbTiO_3$, which is widely used material in piezoelectric and ferroelectric applications; $TiO_2$ which is known for its photocatalytic and electronic properties; and, $Zn_2Ti_3O_8$, which is valued for its catalytic and structural characteristics. However, current approaches to combining these materials into a unified nanocomposite face significant challenges, including achieving phase compatibility, maintaining nanoscale particle sizes, ensuring uniform morphology, and controlling elemental composition during synthesis.

The available synthetic methods, including hydrothermal methods, are unfortunately characterized by complex processing steps, high energetic costs, or inconsistent crystalline phase formation. The synthesis processes lack the ability to produce multiphase nanocomposites with precise control over crystallographic structures, particle size distribution or porosity.

Accordingly, an object of the present disclosure uniquely combines sol-gel synthesis and combustion techniques to address these challenges, yielding a $PbTiO_3/TiO_2/Zn_2Ti_3O_8$ nanocomposite with a well-defined multi-phase structure and grain morphology, and controlled nanoscale properties.

SUMMARY

In an exemplary embodiment, a porous particulate nanocomposite material is described. The porous particulate nanocomposite material comprises, as determined by X-ray diffraction: a cubic $Zn_2Ti_3O_8$ crystalline phase; a tetragonal $PbTiO_3$ crystalline phase; and, an orthorhombic $TiO_2$ crystalline phase. In the porous particulate nanocomposite material, based on the total number of atoms in the nanocomposite material: the atomic concentration of titanium (Ti) is from about 15 to about 25 atom %; the atomic concentration of zinc (Zn) is from about 5 to about 15 atom %; and, the atomic concentration of lead (Pb) is from about 15 to about 25 atom %.

In some embodiments, the porous particulate nanocomposite material has a volume average crystallite size, as determined by X-ray diffraction, of about 65 to about 70 nm.

In some embodiments, the porous particulate nanocomposite material has a volume average crystallite size, as determined by X-ray diffraction, of about 68 to about 70 nm.

In some embodiments, the porous particulate nanocomposite material has a median volume particle size (Dv50) of about 200 to about 250 nm.

In some embodiments, the porous particulate nanocomposite material has a median volume particle size (Dv50) of about 220 to about 240 nm.

In some embodiments, the porous particulate nanocomposite material comprises particles having a sphericity of at least about 0.4 and aggregates thereof.

In some embodiments, the porous particulate nanocomposite material has a heterogeneous distribution of pores.

In an exemplary embodiment, a method for preparing the porous particulate nanocomposite material is described. The method comprises: forming an mixture by adding an aqueous solution of a lead salt and a zinc salt to a solution in a polar protic solvent of a titanium compound selected from the group consisting of titanium methoxide $(Ti(OMe)_4)$, titanium ethoxide $(Ti(OEt)_4)$, titanium isopropoxide $(Ti(OiPr)_4)$, titanium tert-butoxide $(Ti(O-Bu)_4)$ and titanium diisopropoxide bis-acetylacetonate; adding an aqueous solution of an amino acid into the mixture to form a gel; heating the gel under stirring at a temperature of from 200 to 400° C. for a sufficient duration to form a dry powder; and, calcining the dry powder at a temperature of from 500 to 800° C. to form the nanocomposite material.

In some embodiments, the aqueous solution of the lead salt and the zinc salt is added in a dropwise manner into the solution of the titanium compound in a polar protic solvent.

In some embodiments, the lead salt is selected from the group consisting of lead sulfate $(PbSO_4)$, lead nitrate $(Pb(NO_3)_2)$, lead chloride $(PbCl_2)$ and lead acetate $(Pb(CH_3COO)_2)$.

In some embodiments, the lead salt is lead nitrate $(Pb(NO_3)_2)$.

In some embodiments, the zinc salt is selected from the group consisting of: zinc sulfate $(ZnSO_4)$, zinc nitrate $Zn(NO_3)_2$, zinc chloride $(ZnCl_2)$, zinc acetate $(Pb(CH_3COO)_2)$, zinc citrate $((C_6H_5O_7)_2Zn_3)$ and zinc oxalate $(ZnC_2O_4)$.

In some embodiments, the zinc salt is zinc nitrate $Zn(NO_3)_2$.

In some embodiments, the titanium compound is titanium isopropoxide $(Ti(OiPr)_4)$.

In some embodiments, the polar protic solvent is selected from the group consisting of: methanol; ethanol; n-propanol; t-butanol; acetic acid; and, mixtures thereof.

In some embodiments, the polar protic solvent comprises ethanol and/or acetic acid.

In some embodiments, the aqueous solution of the amino acid is added to the mixture in a dropwise manner.

In some embodiments, the amino acid is selected from the group consisting of glycine, alanine, serine, threonine, arginine, glutamic acid, aspartic acid, isoleucine, leucine, valine and mixtures thereof.

In some embodiments, the amino acid comprises or consists of L-alanine.

In yet another exemplary embodiment, a ferroelectric or piezoelectric component including the porous particulate nanocomposite material is also described.

Where the aspects of the disclosure are described herein as having certain embodiments, any one or more of those embodiments can be implemented in or combined with any one of the further embodiments, even if that combination is not explicitly described. Expressed differently, the described embodiments are not mutually exclusive unless stated to be so, and permutations thereof remain within the scope of this disclosure.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1A is a method flowchart for preparing the porous particulate nanocomposite material ($PbTiO_3/TiO_2/Zn_2Ti_3O_8$), according to certain embodiments.

DETAILED DESCRIPTION

Figure 1B:
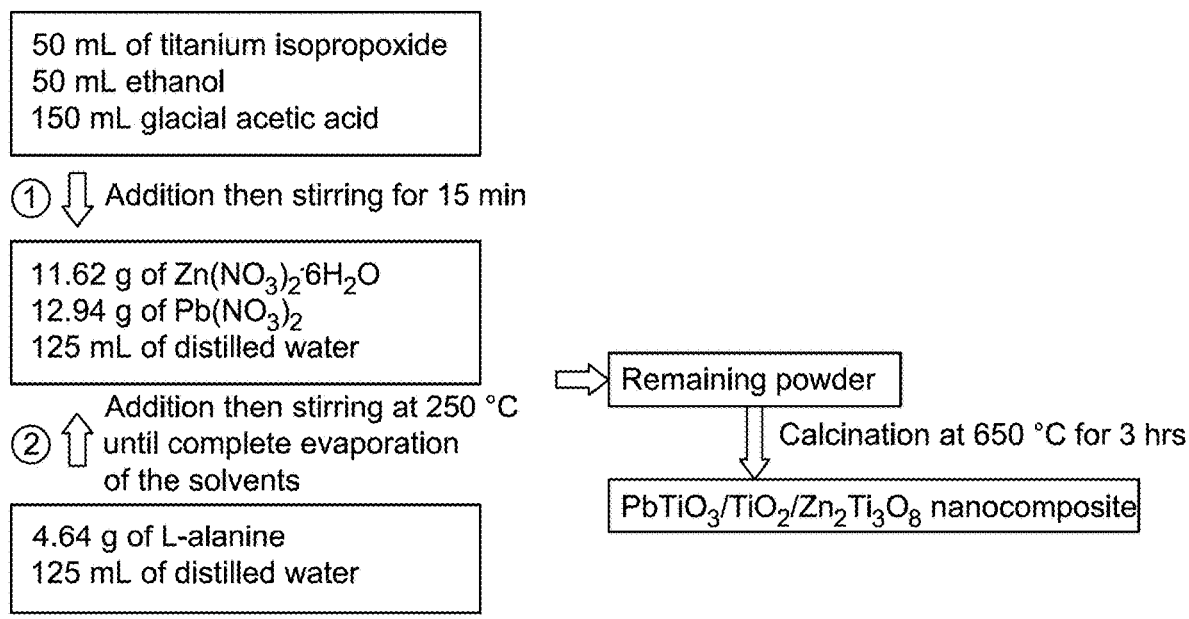
FIG. 1B shows experimental steps for producing the porous particulate nanocomposite material, according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term 'room temperature' refers to a temperature range of 23 degrees Celsius (° C.)+2° C. in the present disclosure. As used herein, 'ambient conditions' means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term 'fraction' refers to a numerical quantity which defines a part up to, but not including, 100 percent or the entirety of the thing in question.

As used herein the term 'disposed' refers to being positioned, placed, deposited, arranged or distributed in a particular manner.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, especially for crystalline materials.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term "atomic concentration" refers to the proportion or percentage of a specific element in a material, calculated based on the number of atoms of that element relative to the total number of atoms present in the material. It is typically expressed as a percentage (%) or as an atomic fraction. This measurement may be determined using the exemplary techniques of X-ray fluorescence (XRF), energy-dispersive X-ray spectroscopy (EDX), or inductively coupled plasma mass spectrometry (ICP-MS). Where stated herein, atomic concentration is determined using energy-dispersive X-ray spectroscopy (EDX).

As used herein, the term 'Scanning Electron Microscopy' or 'SEM' refers to a surface-imaging technique that produces images of a sample by scanning the sample with a focused beam of electrons. Unless otherwise specified, the SEM shall include all imaging techniques using electron beams for imaging.

An orthorhombic crystalline phase refers to a crystal structure having three mutually perpendicular axes of unequal lengths (a/b/c). This means the crystal lattice forms a rectangular prism where the edges represent the three axes, all intersecting at 90-degree angles ($\alpha=\beta=\gamma=$) 90°.

A cubic crystalline phase refers to a crystal structure where the unit cell is shaped like a cube, with three equal-length axes that are perpendicular to each other (at 90° angles). In this crystal system, the atoms or ions are arranged in a repeating pattern within the cubic lattice. The cubic crystalline structure is highly symmetric, possessing four threefold rotational axes and three fourfold rotational axes, permitting rotations of 90° around its specific axes and rotations of 120° about the body diagonals of the cube, while maintaining the same structure.

A tetragonal crystalline phase refers to a crystal structure in which the unit cell of the lattice has two axes of equal-length and a third axis that is of different length, but wherein all axes are at right angles (90°) to each other. This crystal system may be represented as a square base (with two equal axes) and a height (the third axis) which is different, resulting in a rectangular prism-like shape. The tetragonal crystal structure possesses a four-fold rotational symmetry around its unique axis.

The term "piezoelectric" as used herein refers to the ability of a material to generate an electric field or electric potential in response to applied mechanical stress. The piezoelectric effect is reversible in that a material exhibiting the direct piezoelectric effect—the production of an electric potential when stress is applied—also exhibits the reverse piezoelectric effect, the production of stress and/or strain when an electric field is applied. Exemplary piezoelectric components include, but are not limited to sensors, gas igniters, alarms, and audio equipment, where the conversion of mechanical energy into electrical energy—and vice versa—is required.

The term "ferroelectric" references the property of certain materials to have a spontaneous polarization which can be reversed by the application of an external electric field. Ferroelectric materials show a spontaneous nonzero polarization even when the applied field (E) is zero. Spontaneous polarization can be reversed by a strong applied electric field in the opposite direction; the polarization is therefore dependent not only on the current electric field but also on the material's history, yielding hysteresis loops.

Exemplary components which include ferroelectric materials include, but are not limited: capacitors; frequency doublers; optical modulators; thermistors; sensors; and, memory elements.

As used herein, the term 'compound' refers to a chemical entity, regardless of its phase—solid, liquid, or gaseous—as well as its state-crude mixture, purified, or isolated.

As used herein, the term 'particle' refers to a small object that acts as a whole unit with regard to its transport and properties. As used herein, 'nanoparticles'-sometimes contracted herein to NPs-refers to particles having a particle size of 1 nanometer (nm) to 1000 nm.

Unless otherwise stated, the term 'particle size' refers to the largest axis of the particle. In the case of a generally spherical particle, the largest axis is the diameter.

The term 'median volume particle size' (Dv50), as used herein, refers to a particle size corresponding to 50% of the volume of the sampled particles being greater than and 50% of the volume of the sampled particles being smaller than the recited Dv50 value. Similarly, if used, the term 'Dv90' refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term 'nanocomposite' refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

The term "polar solvent" as used herein refers to a solvent having a dielectric constant ($\varepsilon$) of more than 5 as measured at 25° C. The determination of dielectric constant ($\varepsilon$) is known in the art: the use of measured voltages across parallel plate capacitors in such determinations may be mentioned. The term "polar solvent" may encompass both aprotic and protic solvents, wherein protic solvents are those solvents which are capable of yielding or accepting a proton and aprotic solvents are those solvents that do not yield or accept a proton.

The term 'dropwise' as used herein means that one discrete drop or aliquot of a liquid, irrespective of its size or volume, is administered at a time. Discrete drops or aliquots are administered consecutively: they may be provided at regular intervals, at irregular intervals or both such intervals may be applied over the course of administration of the liquid. Further, the volume of an aliquot or drop may be independently determined and thus may be varied over the course of administration of the liquid. Exemplary devices for dropwise addition of liquids include syringes and columns.

As used herein, the term 'sol-gel method' refers to the synthetic process used to produce metal oxide and composite materials by forming a sol through the polymerization of metal salts in a solvent, typically with the help of a chelating agent and an organic compound such as a polyol. The sol is then converted into a gel by the addition of a gelling agent, and, upon heating, the gel undergoes a transformation into a solid metal oxide or composite material.

The term 'sol' as used herein, refers to a colloidal suspension of solid particles in a continuous liquid medium.

As used herein, the term 'gel' refers to a viscoelastic or semi-solid phase that may form when a sol undergoes a transition to a more structured, three-dimensional network. This transition may occur through polymerization or cross-linking, typically facilitated by the addition of a gelling agent or by partial evaporation of the liquid medium of the sol. The result is a gel in which the liquid phase is entrapped within a solid network, creating a material that is free-standing or self-supporting—in that its yield value is greater than the sheer stress imposed by gravity—but which is still composed of a significant amount of liquid.

As utilized herein the term "gelator" generally refers to a component that can form a gel.

As used herein, the term 'calcination' refers to a thermal treatment process which is conducted in the absence of, or under a restricted supply of ambient oxygen. This is performed to remove impurities or volatile substances and/or to induce thermal decomposition or a change in the thermally treated material.

Water, for use as a (co-) solvent or diluent herein, is intended to mean water of low solids content as would be understood by a person of ordinary skill in the art. The water may, for instance, be distilled water, demineralized water, deionized water, reverse osmosis water, boiler condensate water, or ultra-filtration water. Tap water may be tolerated in certain circumstances.

As used herein, term "amino acid," refers to a compound having the general structure $H_2N—C(H)(R)—COOH$, wherein R is an aliphatic, cycloaliphatic, heterocycloaliphatic, aromatic or heteroaromatic group. In an embodiment, R is a $C_1$-$C_8$ alkyl group.

As used herein, '$C_1$-$C_8$ alkyl' group refers to a monovalent group that contains from 1 to n carbons atoms, that is a radical of an alkane and includes straight-chain and branched organic groups. As such, a '$C_1$-$C_8$ alkyl' group refers to a monovalent group that contains from 1 to 8 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen, one or more amino groups, one or more hydroxyl groups; and/or one or more thiol groups. Where applicable for a given moiety (R), a tolerance for one or more distinct substituents within an alkyl group will be noted in the specification.

As used herein, an "$C_6$-$C_{18}$ aryl" group used alone or as part of a larger moiety refers to monocyclic, bicyclic and tricyclic ring systems in which the monocyclic ring system is aromatic or at least one of the rings in a bicyclic or tricyclic ring system is aromatic: the ring system(s) comprise from 6 to 18 carbon atoms. The bicyclic and tricyclic ring systems include benzofused 2-3 membered carbocyclic rings. In the present invention, such aryl groups may be unsubstituted or may be substituted with one or more halogen and/or one or more alkyl groups. Where applicable for a given moiety (R), a tolerance for one or more non-halogen or non-alkyl substituents within an aryl group will be noted in the specification. Exemplary aryl groups include: phenyl; ($C_1$-$C_4$)alkylphenyl, such as tolyl and ethylphenyl; 1,1'-biphenyl; indenyl; naphthalenyl, tetrahydronaphthyl, tetrahydroindenyl; tetrahydroanthracenyl; and, anthracenyl. A preference for phenyl groups may be noted.

As employed herein a "primary amino group" refers to an $NH_2$ group that is attached to an organic radical, and a "secondary amino group" refers to an NH group that is attached to two organic radicals, which may also together be part of a ring. Where used, the term "amine hydrogen" refers to the hydrogen atoms of primary and secondary amino groups.

In addition, the present disclosure is intended to include all isotopes of atoms occurring in the present compounds and complexes. Isotopes include those atoms having the same atomic number but different mass numbers.

The present disclosure is intended to include all hydration states of a given compound or formula, unless otherwise noted or when heating a material.

Aspects of this disclosure pertain to a porous particulate $PbTiO_3/TiO_2/Zn_2Ti_3O_8$ nanocomposite material preferably made using a sol-gel/combustion binary method. One advantage of the method of the present disclosure lies in providing an efficient method for preparing a porous particulate nanocomposite material with applications in advanced electronic, optical, and catalytic devices.

The porous particulate nanocomposite material comprises, as determined by X-ray diffraction: a cubic $Zn_2Ti_3O_8$ crystalline phase; a tetragonal $PbTiO_3$ crystalline phase; and, an orthorhombic $TiO_2$ crystalline phase.

In some embodiments, the porous particulate nanocomposite material has a volume average crystallite size, as determined by X-ray diffraction, ranging from about 65 to about 70 nm, including specific ranges such as about 65-66 nm, about 66-67 nm, about 67-68 nm, about 68-69 nm, about 69-70 nm, about 65-67 nm, about 66-68 nm, about 67-69 nm, about 68-70 nm, about 65-68 nm, about 66-69 nm, about 67-70 nm, about 65-69 nm, about 66-70 nm, about 65.5-66.5 nm, about 66.5-67.5 nm, about 67.5-68.5 nm, about 68.5-69.5 nm, about 69.5-70.5 nm, about 65.5-67 nm, about 66.5-68 nm, about 67.5-69 nm, about 68.5-70 nm, about 65-66.5 nm, about 66-67.5 nm, about 67-68.5 nm, about 68-69.5 nm, about 65.5-68 nm, about 66.5-69 nm, and about 67.5-70 nm. In a preferred embodiment, the porous particulate nanocomposite material has a volume average crystallite size, as determined by X-ray diffraction, of 68.86 nm.

In some embodiments, the morphology of the nanocomposite material includes diverse nanostructures. In a preferred embodiment, the nanocomposite material exhibits a porous structure with agglomerated grains and irregular voids. In some embodiments, the porous particulate nanocomposite material includes particles having a sphericity of at least about 0.4 and aggregates thereof. Observed aggregates of such spherical particles in certain embodiments comprise a multiplicity of such particles, providing the nanocomposite material with a multi-lobal appearance.

In some embodiments, the porous particulate nanocomposite material has a heterogeneous distribution of pores. A fraction of the pores of the particulate nanocomposite material have a diameter of less than about 1 μm. For example, at least about 20%, at least about 30% or at least about 40% of the pores of the particulate nanocomposite material have a diameter less than about 1 μm. In certain embodiments, which are not mutually exclusive of those embodiments related to the pore diameter, a fraction of the pores have substantial circularity.

In some embodiments, the porous particulate nanocomposite material has a median volume particle size (Dv50) of from about 200 to about 250 nm, including specific ranges such as about 200-205 nm, about 205-210 nm, about 210-215 nm, about 215-220 nm, about 220-225 nm, about 225-230 nm, about 230-235 nm, about 235-240 nm, about 240-245 nm, about 245-250 nm, about 200-210 nm, about 205-215 nm, about 210-220 nm, about 215-225 nm, about 220-230 nm, about 225-235 nm, about 230-240 nm, about 235-245 nm, about 240-250 nm, about 200-215 nm, about 205-220 nm, about 210-225 nm, about 215-230 nm, about 220-235 nm, about 225-240 nm, about 230-245 nm, about 235-250 nm, about 200-225 nm, about 205-230 nm, and about 210-240 nm. Desirably, the porous particulate nanocomposite material has a median volume particle size (Dv50) of from about 220 to about 240 nm. In a preferred embodiment, the porous particulate nanocomposite material has a median volume particle size (Dv50) of 230.12 nm.

In the porous particulate nanocomposite material, based on the total number of atoms in the nanocomposite material: the atomic concentration of titanium (Ti) is from about 15 to about 25 atom %; the atomic concentration of zinc (Zn) is from about 5 to about 15 atom %; and, the atomic concentration of lead (Pb) is from about 15 to about 25 atom %.

In some embodiments, the atomic concentration of titanium in the nanocomposite material, based on the total number of atoms in the nanocomposite material is from about 15 to 20 atom %, for example from about 16 to about 19 atom %, from about 17 to about 19 atom % or about 18 to about 19 atom %. In a preferred embodiment, the atomic concentration of titanium in the nanocomposite material is 18.50% of the total number of atoms.

In some embodiments, the atomic concentration of zinc in the nanocomposite material, based on the total number of atoms in the nanocomposite material is from about 5 to about 10 atom %, from about 6 to about 9 atom %, from about 7 to about 9 atom % or from about 8 to about 9 atom %. In a preferred embodiment, the atomic concentration of zinc in the nanocomposite material is 8.40% of the total number of atoms.

In some embodiments, the atomic concentration of lead in the nanocomposite material, based on the total number of atoms in the nanocomposite material is from about ranges from 15 to 20 atom %, for example from about 16 to about 19 atom %, from about 17 to about 19 atom % or about 18 to about 19 atom %. In a preferred embodiment, the atomic concentration of lead in the nanocomposite material is 18.70% of the total number of atoms.

In some embodiments, the atomic concentration of oxygen in the nanocomposite material, based on the total number of atoms in the nanocomposite material is from about 50 to about 60 atom %, for example from about 52 to about 58 atom %, from about 52 to about 56 atom %, about 53 to about 55 atom % or from about 54 to about 55 atom %. In a preferred embodiment, the atomic concentration of oxygen in the nanocomposite material is 54.40% of the total number of atoms.

FIG. 1A illustrates a schematic flow chart of a method 50 of preparing the porous particulate nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes forming a mixture by adding an aqueous solution of a lead salt and a zinc salt to a solution in a polar protic solvent of a titanium compound selected from the group consisting of titanium methoxide (Ti(OMe)$_4$), titanium ethoxide (Ti(OEt)$_4$), titanium isopropoxide (Ti(OiPr)$_4$), titanium tert-butoxide (Ti(O-tBu)$_4$) and titanium diisopropoxide bis-acetylacetonate. In some embodiments, the aqueous solution of the lead salt and the zinc salt is added in a dropwise manner into the solution of the titanium compound in a polar protic solvent.

In certain embodiments, the final molar ratio of Pb:Zn:Ti in the admixture formed in step 52—to which admixture the aqueous amino acid is added at Step 54 of the method illustrated in FIG. 1—may be from about (0.8-1.2):(0.8-1.2):(3.2-4.8), for example from about (0.9-1.1):(0.9-1.1):(3.6-4.4). In certain embodiments, the molar ratio of Pb:Zn:Ti in the admixture is about 1:1:4.

Exemplary lead salts having utility in the present method—and which may be used alone or in combination—include, but are not limited to, lead sulfate (PbSO$_4$), lead chloride (PbCl$_2$), lead acetate (Pb(CH$_3$COO)$_2$), lead bromide (PbBr$_2$), lead iodide (PbI$_2$), lead carbonate (PbCO$_3$), lead oxide (PbO), lead sulfide (PbS), lead chromate (PbCrO$_4$), lead fluoroborate (Pb(BF$_4$)$_2$), lead perchlorate (Pb(ClO$_4$)$_2$), lead thiocyanate (Pb(SCN)$_2$), lead cyanide (Pb(CN)$_2$), lead fluoride (PbF$_2$), lead tartrate (PbC$_4$H$_4$O$_6$), lead oxalate (PbC$_2$O$_4$), lead phosphate (Pb$_3$(PO$_4$)$_2$), lead silicate (PbSiO$_3$), lead arsenate (Pb$_3$(AsO$_4$)$_2$), lead tungstate (PbWO$_4$), lead molybdate (PbMoO$_4$), lead citrate (PbC$_6$H$_5$O$_7$), lead lactate (Pb(C$_3$H$_5$O$_3$)$_2$), lead acetate trihydrate (Pb(CH$_3$COO)$_2$·3H$_2$O), lead dithionate (PbS$_2$O$_6$), lead tetrafluoroborate (Pb(BF$_4$)$_2$), lead hexafluorosilicate (PbSiF$_6$), lead tellurite (PbTeO$_3$), and lead vanadate (Pb$_3$(VO$_4$)$_2$). In some embodiments, the lead salt may be selected from lead sulfate (PbSO$_4$), lead nitrate (Pb(NO$_3$)$_2$), lead chloride (PbCl$_2$) and lead acetate (Pb(CH$_3$COO)$_2$). In a preferred embodiment, the lead salt is lead nitrate (Pb(NO$_3$)$_2$).

Exemplary zinc salts having utility in the present method—and which may be used alone or in combination—include, but are not limited to, zinc sulfate (ZnSO$_4$), zinc chloride (ZnCl$_2$), zinc acetate (Zn(CH$_3$COO)$_2$), zinc bromide (ZnBr$_2$), zinc iodide (ZnI$_2$), zinc carbonate (ZnCO$_3$), zinc oxide (ZnO), zinc sulfide (ZnS), zinc chromate (ZnCrO$_4$), zinc fluoride (ZnF$_2$), zinc phosphate (Zn$_3$(PO$_4$)$_2$), zinc silicate (Zn$_2$SiO$_4$), zinc arsenate (Zn$_3$(AsO$_4$)$_2$), zinc molybdate (ZnMoO$_4$), zinc tungstate (ZnWO$_4$), zinc citrate (Zn$_3$(C$_6$HsO$_7$)$_2$), zinc tartrate (ZnC$_4$H$_4$O$_6$), zinc lactate (Zn(C$_3$HsO$_3$)$_2$), zinc oxalate (ZnC$_2$O$_4$), zinc perchlorate (Zn(ClO$_4$)$_2$), zinc thiocyanate (Zn(SCN)$_2$), zinc cyanide (Zn(CN)$_2$), zinc hexafluorosilicate (ZnSiF$_6$), zinc tetrafluoroborate (Zn(BF$_4$)$_2$), zinc hydrosulfide (Zn(HS)$_2$), zinc dithionate (ZnS$_2$O$_6$), zinc arsenite (ZnAsO$_2$), zinc vanadate (Zn$_3$(VO$_4$)$_2$), zinc ferrite (ZnFe$_2$O$_4$), and zinc tellurite (ZnTeO$_3$). In some embodiments, the zinc salt may be selected from zinc sulfate (ZnSO$_4$), zinc nitrate Zn(NO$_3$)$_2$, zinc chloride (ZnCl$_2$), zinc acetate (Pb(CH$_3$COO)$_2$), zinc citrate ((C$_6$H$_5$O$_7$)$_2$Zn$_3$) and zinc oxalate (ZnC$_2$O$_4$). In a preferred embodiment, the zinc salt is zinc nitrate Zn(NO$_3$)$_2$.

In some embodiments, the titanium compound may be selected from the group consisting of titanium methoxide (Ti(OMe)$_4$), titanium ethoxide (Ti(OEt)$_4$), titanium isopropoxide (Ti(OiPr)$_4$), titanium tert-butoxide (Ti(O-tBu)$_4$) and titanium diisopropoxide bis-acetylacetonate. In preferred embodiment, the titanium compound is titanium isopropoxide (Ti(OiPr)$_4$).

Exemplary polar protic solvents, which may be used alone or in combination in the present method include, but are not limited to, methanol, isopropanol, n-butanol, t-butanol, propanol, isobutanol, pentanol, hexanol, glycerol, ethylene glycol, diethylene glycol, triethylene glycol, formic acid, lactic acid, tartaric acid, citric acid, glycolic acid, butyric acid, propionic acid, benzoic acid, malic acid, succinic acid, salicylic acid, trifluoroacetic acid, phenol, water, hydroxyacetic acid, oxalic acid, hydrogen peroxide, and sorbitol. In some embodiments, the polar protic solvent may be selected from methanol; ethanol; n-propanol; t-butanol; acetic acid; and, mixtures thereof. In a preferred embodiment, the polar protic solvent includes at least one of ethanol and acetic acid.

At step 54, the method 50 includes adding an aqueous solution of an amino acid into the mixture to form a gel. In present disclosure, it is preferred that the aqueous solution of the amino acid is added to the mixture in a dropwise manner.

Exemplary amino acids, which may be used alone or in combination, include but are not limited to aminos acid having the having the general formula H$_2$N—C(H)(R)—COOH, wherein R is a C$_1$-C$_8$ alkyl group. In an important embodiment, the amino acid is selected from the group consisting of: glycine; alanine; serine; threonine; glutamic acid; aspartic acid; isoleucine; leucine; valine, and, mixtures thereof. A preference may be noted for the use of alanine and, more particularly, for L-alanine.

Referring back to FIG. 1, at step 54 of the method, the total amount of added amino acid, optionally in a dropwise manner, is conventionally determined by the observed gel formation. However, in certain embodiments, the molar ratio of the total amount of added amino acid to the total moles of Zn, Ti and Pb of may be from about 1:10 to about 1:2, for example from about 1:10 to about 1:4 or from about 1:10 to about 1:6.

At step 56, the method 50 includes heating the gel under stirring at a temperature of from 200 to 400° C. for a sufficient duration to form a dry powder. In some embodiments, the gel is heated under stirring at a temperature ranging from 200 to 400° C., including specific ranges such as 200-210° C., 210-220° C., 220-230° C., 230-240° C., 240-250° C., 250-260° C., 260-270° C., 270-280° C., 280-290° C., 290-300° C., 300-310° C., 310-320° C., 320-330° C., 330-340° C., 340-350° C., 350-360° C., 360-370° C., 370-380° C., 380-390° C., 390-400° C., 205-215° C., 215-225° C., 225-235° C., 235-245° C., 245-255° C., 255-265° C., 265-275° C., 275-285° C., 285-295° C., and 295-305° C., for a sufficient duration to form a dry powder. In a preferred embodiment, the gel is heated at 250° C.

At step 58, the method 50 includes calcining the dry powder at a temperature of from 500 to 800° C. to form the nanocomposite material. In some embodiments, the dry powder is calcined at a temperature ranging from 500 to 800° C., including specific ranges such as about 500-510° C., about 510-520° C., about 520-530° C., about 530-540° C., about 540-550° C., about 550-560° C., about 560-570° C., about 570-580° C., about 580-590° C., about 590-600° C., about 600-610° C., about 610-620° C., about 620-630° C., about 630-640° C., about 640-650° C., about 650-660° C., about 660-670° C., about 670-680° C., about 680-690° C., about 690-700° C., about 700-710° C., about 710-720° C., about 720-730° C., about 730-740° C., about 740-750° C., about 750-760° C., about 760-770° C., about 770-780° C., about 780-790° C., and about 790-800° C., to form the nanocomposite material. In a preferred embodiment, the dry powder is calcined at a temperature of 650° C.

In some embodiments, the solid is calcined for a duration ranging from about 2 to about 4 hours, Exemplary durations for the calcination include about 2-2.1 hours, about 2.1-2.2 hours, about 2.2-2.3 hours, about 2.3-2.4 hours, about 2.4-2.5 hours, about 2.5-2.6 hours, about 2.6-2.7 hours, about 2.7-2.8 hours, about 2.8-2.9 hours, about 2.9-3 hours, about 3-3.1 hours, about 3.1-3.2 hours, about 3.2-3.3 hours, about 3.3-3.4 hours, about 3.4-3.5 hours, about 3.5-3.6 hours, about 3.6-3.7 hours, about 3.7-3.8 hours, about 3.8-3.9 hours, about 3.9-4 hours, about 2-2.5 hours, about 2.5-3 hours, about 3-3.5 hours, about 3.5-4 hours, about 2-3 hours, about 3-4 hours, about 2.1-2.6 hours, about 2.6-3.1 hours, about 3.1-3.6 hours or about 2.2-3.2 hours to form the $PbTiO_3/TiO_2/Zn_2Ti_3O_8$) nanocomposite material. In the preferred embodiment, the solid is calcined for about 3 hours to form the nanocomposite material.

It is not precluded in the present method, that the particles directly obtained from the calcination step may be subjected to at least one of comminution, homogenization or classification in order to moderate the particle size distribution thereof.

In certain embodiments, the porous particulate nanocomposite material demonstrates piezoelectricity. In other embodiments, the porous particulate nanocomposite material demonstrates ferroelectricity. The present disclosure therefore envisages the use of the porous particulate nanocomposite material in or as a ferroelectric component or a piezoelectric component.

The porous particulate nanocomposite material of the present disclosure presents several advantages, in particular an enhanced surface area, which may boost reactivity and efficiency in applications such as catalysis and adsorption. The adsorption capacity of the material may allow for selective surface adsorption or trapping of molecules, making them ideal for applications like water treatment, and pollutant removal.

In some embodiments, a heterogeneous catalyst is provided which includes the porous particulate nanocomposite material. A heterogeneous catalyst is a catalyst that exists in a different phase from the reactants in a chemical reaction. Herein, where the catalyst will comprise a particulate solid, the reactants may be gases and/or liquids. The catalytic process involves the reactants adsorbing onto the surface of the solid catalyst, where the reaction takes place, and then desorbing the products after the reaction. The catalyst itself remains chemically unchanged during the reaction. Where there are no substantial deposits on the nanocomposite and the catalyst maintains its structural integrity during the catalyzed reaction, a heterogenous catalyst comprising the particulate nanocomposite may be reused.

A method of immobilizing inorganic contaminants disposed in an aqueous medium is also described. The method includes contacting the aqueous medium with the porous particulate nanocomposite material as described hereinabove. This method relies on the adsorption of the inorganic contaminants—of which metal ions dissolved in waste water may be mentioned as important examples—onto the porous particulate nanocomposite material.

A method of degrading organic pollutants disposed in an aqueous medium is still further described. The method includes contacting the aqueous medium under actinic irradiation with the porous particulate nanocomposite material as described herein.

Exemplary organic pollutants include, but are not limited to: dyes; phenols; polycyclic aromatic hydrocarbons (PAH); organic herbicides; organic pesticides, including organic algicides, fungicides, bactericides, virucides, insecticides and miticides; and, persistent organic pollutants. For completeness, a persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme (UNEP), 2001 Stockholm Convention on Persistent Organic Pollutants.

The methods of immobilizing inorganic contaminants and of photocatalytic degradation of organic pollutants both require an aqueous medium to be brought into contact with the porous particulate nanocomposite material for a sufficient contact time to permit adsorption of the species concerned. The aqueous medium may be provided as a static volume in which the nanocomposite material is dispersed. In an alternative embodiment, the aqueous medium may be provided as fixed volume in which the nanoparticulate is dispersed but which is subjected to agitation: the nanoparticulate material may be suspended in the volume or may be constrained within a bed or membrane or by a support. In a further non-limiting alternative, the aqueous medium may be provided as a flow which contacts the porous particulate nanocomposite material. In this embodiment, the porous particulate nanocomposite material may need to constrained within a bed or membrane which the aqueous medium contacts as either a perpendicular or tangential (cross-) flow stream.

EXAMPLES

The following examples demonstrate a $PbTiO_3/TiO_2/Zn_2Ti_3O_8$ nanocomposite material or nanocomposite. The examples are provided solely for illustration and are not to be construed as limitations of the present disclosure, as many variations thereof are possible without departing from the spirit and scope of the present disclosure.

Example 1: Synthesis of $PbTiO_3/TiO_2/Zn_2Ti_3O_8$ Nanocomposite Material Using Sol-Gel/Combustion Method The synthesis of the $PbTiO_3/TiO_2/Zn_2Ti_3O_8$ nanocomposite material was carried out following a systematic procedure as illustrated in FIG. 1B. Initially, 50 mL of titanium isopropoxide was dissolved in a mixture of 50 mL ethanol and 150 mL glacial acetic acid to prepare the first solution. Separately, 11.62 g of $Zn(NO_3)_2 \cdot 6H_2O$ and 12.94 g of $Pb(NO_3)_2$ were dissolved in 125 mL of distilled water to form the second solution. Additionally, 4.64 g of L-alanine was dissolved in 125 mL of distilled water to create the third solution. The first solution was gradually added to the second solution, under continuous stirring for 15 min. Subsequently, the third solution was introduced into the mixture by continuous stirring at 250° C. until the solvents were evaporated entirely. The resulting dry powder was then calcined at 650° C. for 3 hours, yielding the $PbTiO_3/TiO_2/Zn_2Ti_3O_8$ nanocomposite.

Figure 2:
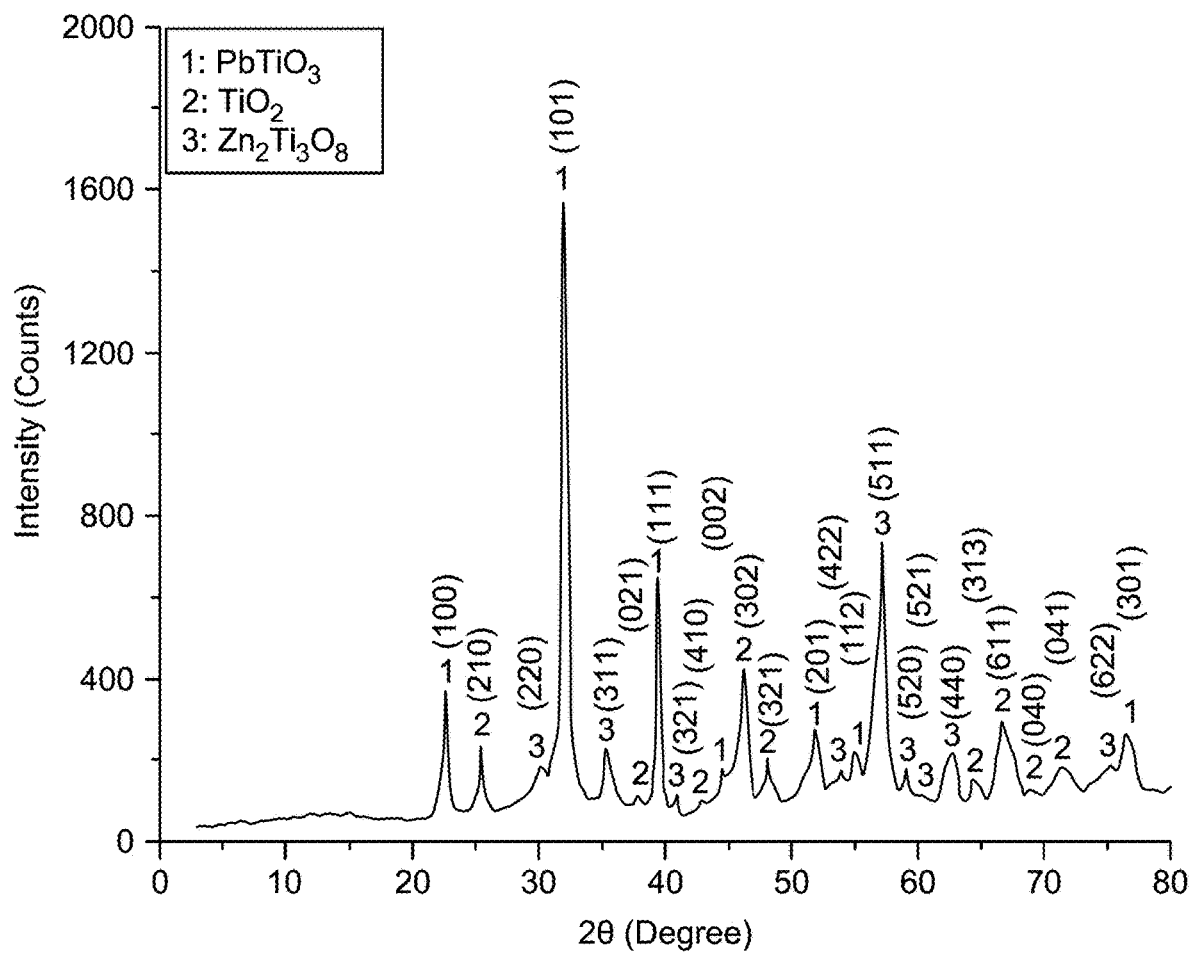
FIG. 2 illustrates an X-ray diffraction (XRD) pattern of the porous particulate nanocomposite material, according to certain embodiments.

The X-ray diffraction (XRD) pattern of the nanocomposite, presented in FIG. 2 highlights the presence of three distinct phases: $PbTiO_3$, $TiO_2$, and $Zn_2Ti_3O_8$. $PbTiO_3$ is identified as lead titanium oxide having a tetragonal crystal system with International Centre for Diffraction Data (ICDD) entry JCPDS No. 01-082-3365, the disclosure of which is incorporated herein in its entirety. The 2θ diffraction peaks of $PbTiO_3$ appear at 22.56, 31.99, 39.56, 44.49, 51.84, 55.08, and 76.59, corresponding to the Miller indices (100), (101), (111), (002), (201), (112), and (301), respectively. $TiO_2$ is identified as titanium oxide having an orthorhombic crystal system with International Centre for Diffraction Data (ICDD) entry JCPDS No. 01-071-4943, the disclosure of which is incorporated herein in its entirety. The 2θ diffraction peaks of $TiO_2$ appear at 25.39, 37.88, 42.81, 46.17, 48.06, 64.42, 66.74, 68.93, and 71.24, corresponding to the Miller indices (210), (021), (410), (302), (321), (313), (611), (040), and (041), respectively. $Zn_2Ti_3O_8$ is identified as zinc titanium oxide having a cubic crystal system with International Centre for Diffraction Data (ICDD) entry JCPDS No. 00-013-0471, the disclosure of which is incorporated herein in its entirety. The 2θ diffraction peaks of $Zn_2Ti_3O_8$ appear at 30.11, 35.35, 40.82, 53.94, 56.98, 58.97, 60.23, 62.53, and 75.24, corresponding to the Miller indices (220), (311), (321), (422), (511), (520), (521), (440), and (622), respectively. As shown in Table 1 herein below, the average crystallite size of the synthesized nanocomposite is 68.86 nm. These results confirm the successful synthesis of a multi-phase nanocomposite with well-defined crystallographic structures.

TABLE 1

| Components of the nanocomposite | | | | |
|---|---|---|---|---|
| Phase | Chemical name | JCPDS No. | Crystal system | The average crystallite size of the nanocomposite (nm) |
| $PbTiO_3$ | Lead titanium oxide | 01-082-3365 | Tetragonal | 68.86 |
| $TiO_2$ | Titanium oxide | 01-071-4943 | Orthorhombic | |
| $Zn_2Ti_3O_8$ | Zinc titanium oxide | 00-013-0471 | Cubic | |

Figure 3:
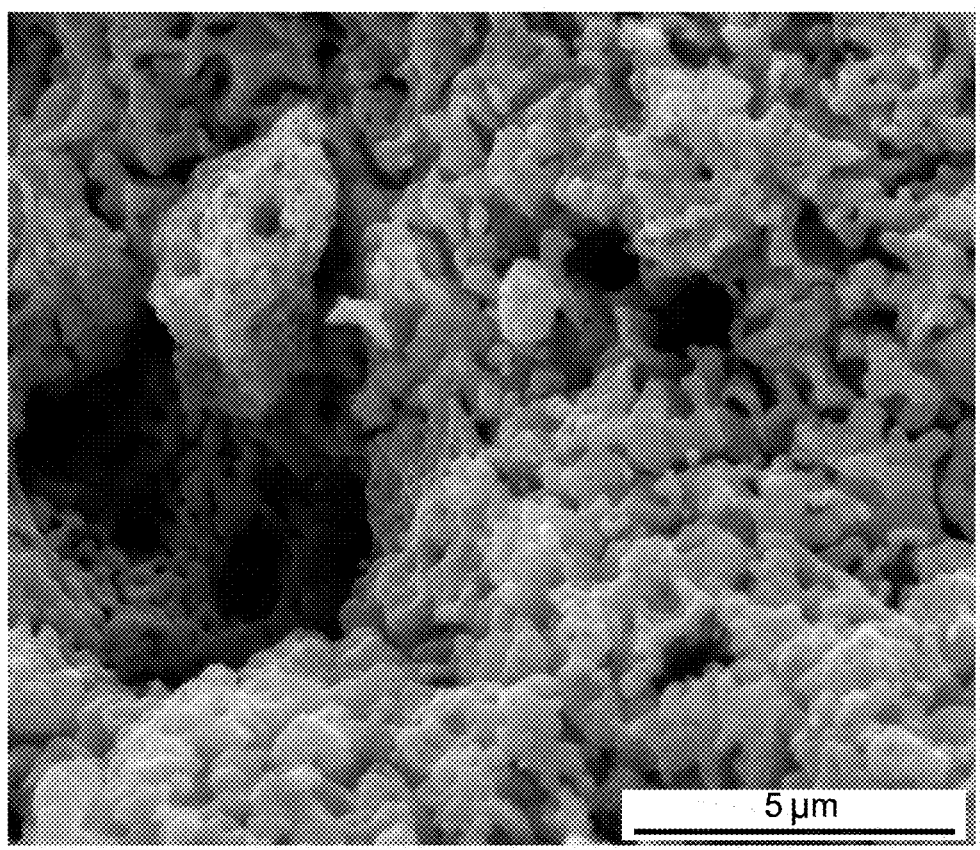
FIG. 3 shows a scanning electron microscope (SEM) image of the porous particulate nanocomposite material, according to certain embodiments.

FIG. 3 shows the scanning electron microscope (SEM) image of the nanocomposite, highlighting its detailed surface morphology. The SEM image reveals a porous structure with agglomerated grains and irregular voids. The observed shapes in the SEM include spherical grains, interconnected clusters of said spherical grains, and void-like cavities, which demonstrate the nanoscale nature of the material. The interconnected clusters provide a multi-lobal appearance to the nanocomposite material. A fraction—for instance at least 10%, at least 20% or at least 30%—of the observed pores have substantial circularity, whereas voids within the material exhibit a more heterogeneous shape.

The average grain size of the nanocomposite, calculated from the SEM analysis, is 230.12 nm. This microstructural analysis confirms the successful synthesis of the nanocomposite with a distinct and well-defined morphology.

Figure 4:
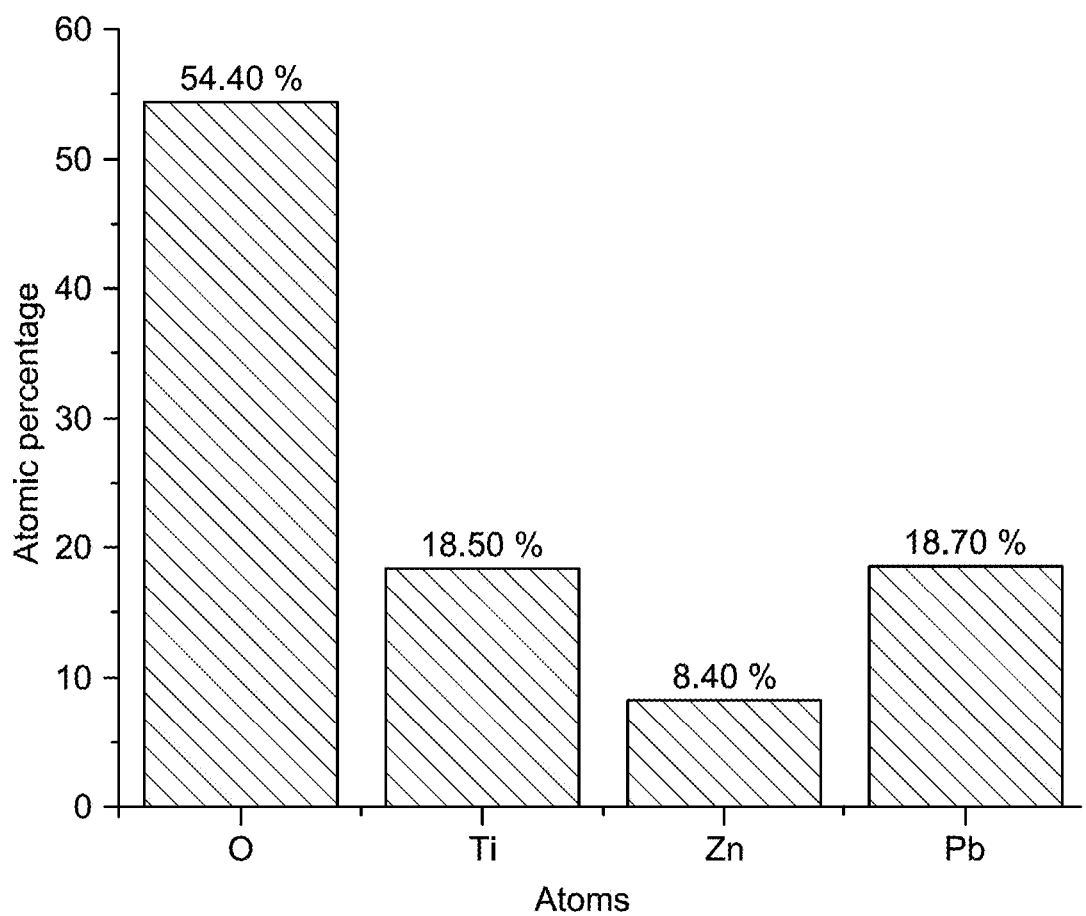
FIG. 4 is a graph showing the atomic percentage distribution of elements in the porous particulate nanocomposite material, as determined by energy-dispersive X-ray spectroscopy (EDX) analysis, according to certain embodiments.

FIG. 4 illustrates the elemental composition of the synthesized $PbTiO_3/TiO_2/Zn_2Ti_3O_8$ nanocomposite, as determined by energy-dispersive X-ray (EDX) analysis. The atomic percentage distribution reveals that oxygen (O) constitutes 54.40%, titanium (Ti) makes up 18.50%, zinc (Zn) accounts for 8.40%, and lead (Pb) represents 18.70%. These results confirm the presence of the expected elements in the nanocomposite and validate the successful synthesis of the material.

The nanocomposite's thermal stability and multi-phase composition position it as an advanced material for use in adsorption, catalysis, and other high-performance applications across environmental and industrial sectors.

The present disclosure provides a $PbTiO_3/TiO_2/Zn_2Ti_3O_8$ nanocomposite synthesized using a unique sol-gel/combustion binary method. The nanocomposite is characterized by its multi-phase structure, combining the distinct properties of lead titanium oxide ($PbTiO_3$), titanium oxide ($TiO_2$), and zinc titanium oxide ($Zn_2Ti_3O_8$). The XRD analysis of an exemplified nanocomposite confirms the successful formation of these three phases, with crystallographic systems identified as tetragonal, orthorhombic, and cubic, respectively, and an average crystallite size of 68.86 nm. SEM analysis reveals a porous structure with features such as spherical grains, interconnected clusters, and void-like cavities, with an average grain size of 230.12 nm. Energy-dispersive X-ray (EDX) analysis of that exemplified nanocomposite material shows the elemental composition with oxygen at 54.40 atom %, titanium at 18.50 atom %, zinc at 8.40 atom %, and lead at 18.70 atom %, validating the presence of all expected components. The present disclosure offers a novel material with a precisely engineered microstructure, combining the synergistic properties of its constituents, and establishes a scalable and efficient approach to the nanocomposite fabrication.

Numerous modifications and variations of the present disclosure are possible in light of the above teachings. It is, therefore, to be understood that within the scope of the appended claims, the invention may be practiced otherwise than as specifically described herein.

The invention claimed is:

1. A porous particulate nanocomposite material comprising, as determined by X-ray diffraction:
a cubic $Zn_2Ti_3O_8$ crystalline phase;
a tetragonal $PbTiO_3$ crystalline phase; and,
an orthorhombic $TiO_2$ crystalline phase,
wherein, based on the total number of atoms in the nanocomposite material:
the atomic concentration of titanium (Ti) is from about 15 to about 25 atom %;
the atomic concentration of zinc (Zn) is from about 5 to about 15 atom %; and,
the atomic concentration of lead (Pb) is from about 15 to about 25 atom %.

2. The porous particulate nanocomposite material according to claim 1, having a volume average crystallite size, as determined by X-ray diffraction, of from about 65 to about 70 nm.

3. The porous particulate nanocomposite material according to claim 1, having a volume average crystallite size, as determined by X-ray diffraction, of from about 68 to about 70 nm.

4. The porous particulate nanocomposite material according to claim 1, having a median volume particle size (Dv50) of from about 200 to about 250 nm.

5. The porous particulate nanocomposite material according to claim 1, having a median volume particle size (Dv50) of from about 220 to about 240 nm.

6. The porous particulate nanocomposite material according to claim 1, in the form of particles having a sphericity of at least about 0.4 and aggregates thereof.

7. The porous particulate nanocomposite material according to claim 1, having a heterogeneous distribution of pores.

8. A method for preparing the porous particulate nanocomposite material as defined in claim 1, the method comprising:
forming a mixture by adding an aqueous solution of a lead salt and a zinc salt to a solution in a polar protic solvent of a titanium compound selected from the group consisting of titanium methoxide ($Ti(OMe)_4$), titanium ethoxide ($Ti(OEt)_4$), titanium isopropoxide ($Ti(OiPr)_4$), titanium tert-butoxide ($Ti(O\text{-}tBu)_4$) and titanium diisopropoxide bis-acetylacetonate;
adding an aqueous solution of an amino acid into the mixture to form a gel;
heating the gel under stirring at a temperature of from 200 to 400° C. for a sufficient duration to form a dry powder; and,
calcining the dry powder at a temperature of from 500 to 800° C. to form the nanocomposite material.

9. The method according to claim 8, wherein the aqueous solution of the lead salt and the zinc salt is added in a dropwise manner into the solution of the titanium compound in a polar protic solvent.

10. The method according to claim 8, wherein the lead salt is selected from the group consisting of lead sulfate ($PbSO_4$), lead nitrate ($Pb(NO_3)_2$), lead chloride ($PbCl_2$) and lead acetate ($Pb(CH_3COO)_2$).

11. The method according to claim 8, wherein the lead salt is lead nitrate ($Pb(NO_3)_2$).

12. The method according to claim 8, wherein the zinc salt is selected from the group consisting of: zinc sulfate ($ZnSO_4$), zinc nitrate $Zn(NO_3)_2$, zinc chloride ($ZnCl_2$), zinc acetate ($Pb(CH_3COO)_2$), zinc citrate (($C_6H_5O_7)_2Zn_3$) and zinc oxalate ($ZnC_2O_4$).

13. The method according to claim 8, wherein the zinc salt is zinc nitrate $Zn(NO_3)_2$.

14. The method according to claim 8, wherein the titanium compound is titanium isopropoxide ($Ti(OiPr)_4$).

15. The method according to claim 8, wherein the polar protic solvent is selected from the group consisting of: methanol; ethanol; n-propanol; t-butanol; acetic acid; and, mixtures thereof.

16. The method according to claim 8, wherein the polar protic solvent comprises ethanol and/or acetic acid.

17. The method according to claim 8, wherein the aqueous solution of the amino acid is added to the mixture in a dropwise manner.

18. The method according to claim 8, wherein the amino acid is selected from the group consisting of glycine, alanine, serine, threonine, arginine, glutamic acid, aspartic acid, isoleucine, leucine, valine and mixtures thereof.

19. The method according to claim 8, wherein the amino acid consists of L-alanine.

20. A ferroelectric or piezoelectric component comprising the porous particulate nanocomposite material as defined in claim 1.

* * * * *